US008155252B2

(12) United States Patent
Piirainen et al.

(10) Patent No.: US 8,155,252 B2
(45) Date of Patent: Apr. 10, 2012

(54) FREQUENCY OFFSET CORRECTION (75) Inventors: Olli Piirainen, Oulu (FI); Markku Vainikka, Kiviniemi (FI); Juha P. Karjalainen, Oulu (FI)

(73) Assignee: Nokia Corporation, Espoo (FI)

( * ) Notice: Subject to any disclaimer, the term of this patent is extended or adjusted under 35 U.S.C. 154(b) by 793 days.

(21) Appl. No.: 11/806,836

(22) Filed: Jun. 4, 2007

(65) Prior Publication Data
US 2008/0240311 A1 Oct. 2, 2008

(30) Foreign Application Priority Data

Mar. 27, 2007 (FI) ...................................... 20075198

(51) Int. Cl.
*H04L 27/06* (2006.01)
(52) U.S. Cl. ........ 375/344; 375/324; 375/326; 455/136; 455/192.1; 455/192.2
(58) Field of Classification Search .................. 375/260, 375/344, 324, 326; 370/344, 208, 319; 455/703, 455/136, 192.1, 192.2; 702/75, 79
See application file for complete search history.

(56) References Cited

U.S. PATENT DOCUMENTS

| | | | | |
|---|---|---|---|---|
| 7,139,340 B2 * | 11/2006 | Scarpa | ............................ | 375/344 |
| 2004/0076239 A1 * | 4/2004 | Yu et al. | .......................... | 375/260 |
| 2005/0259727 A1 * | 11/2005 | Benvenuto et al. | ........... | 375/233 |
| 2006/0203932 A1 * | 9/2006 | Palanki et al. | ................. | 375/295 |
| 2007/0002800 A1 | 1/2007 | Sondur et al. | | |
| 2007/0004337 A1 | 1/2007 | Biswas et al. | | |
| 2007/0004465 A1 * | 1/2007 | Papasakellariou et al. | ... | 455/571 |
| 2007/0064824 A1 * | 3/2007 | Wang et al. | ..................... | 375/260 |
| 2007/0070879 A1 * | 3/2007 | Yoshida et al. | ............... | 370/208 |
| 2007/0165588 A1 * | 7/2007 | McCoy | .......................... | 370/344 |
| 2007/0280365 A1 * | 12/2007 | Seki | ............................... | 375/260 |
| 2008/0075191 A1 * | 3/2008 | Haartsen | ....................... | 375/285 |
| 2008/0198911 A1 * | 8/2008 | Hui et al. | ....................... | 375/229 |
| 2008/0232516 A1 * | 9/2008 | Cheng et al. | ................... | 375/344 |
| 2010/0208718 A1 * | 8/2010 | Yoshida et al. | ............... | 370/343 |

OTHER PUBLICATIONS

Qin Shengping, Yin Changchuan, Li jianfeng and Yue Guangxin, "Pilot-Symbol-Aided Frequency Offset Estimation and Correction for OFDM system", Beijing University of Posts and Telecommunications, China, 2003, IEEE.*
R1-072363,"Considerations for Frequency Control in E-UTRA Uplink", 3GPP TSG-RAN WG1 #49, Alcatel-Lucent, Kobe, Japan, May 7-11, 2007.*
Huang, D. et al.; "An Interference-Cancellation Scheme for Carrier Frequency Offsets Correction in OFDMA Systems"; vol. 53, No. 7; pp. 1155-1165; Jul. 2005.
Pun, M. et al.; "Joint Maximum Likelihood Estimation of Carrier Frequency Offset and Channel in Uplink OFDMA Systems"; pp. 3748-3752; Nov. 29-Dec. 3, 2004.
Tevfik, Y. et al.; "Frequency Offset Compensation with Successive Cancellation in Uplink OFDMA Systems"; pp. 1-5; Sep. 2006.
Myung, H. et al., ; "Single Carrier FDMA for uplink Wireless Transmission"; pp. 30-38; Sep. 2006.
International Search Report, PCT/FI2008/050135 dated Jun. 12, 2008.

* cited by examiner

*Primary Examiner* — Aristocratis Fotakis
(74) *Attorney, Agent, or Firm* — Alston & Bird LLP (57) ABSTRACT

A frequency error correction scheme applicable in a receiver of a mobile telecommunication system is presented. The present frequency error correction scheme is carried out in a time domain after an equalization process. The present frequency error correction scheme may be applied to a base station receiving signals transmitted according to a single-carrier frequency division multiple access communication scheme. The separation of different received signals for further processing is carried out in the frequency domain before the equalization and the frequency error correction.

24 Claims, 2 Drawing Sheets

FREQUENCY OFFSET CORRECTION

FIELD

The invention relates to frequency-offset correction in a radio receiver of a telecommunication system.

BACKGROUND

In mobile telecommunication systems, there always exists frequency offset in a signal transmitted from a radio transmitter to a radio receiver. The frequency offset may be caused by a frequency difference between oscillators of the transmitter and the receiver, but a major cause for the frequency offset is Doppler shift affecting the signal in a mobile environment. The Doppler shift is caused by the change in the distance between a mobile terminal and a base station due to the movement of the mobile terminal.

Frequency offsets typically leak to a baseband part of the receiver, thereby causing a phase rotation, i.e. frequency error, in a received baseband signal. This phase rotation has to be compensated for in order to ensure a reliable detection of received data. First of all, the frequency error introduced into the received signal is estimated and, thereafter, the phase rotation in the received baseband signal is compensated for by weighting the received signal with estimated phase rotation values which are used for rotating the phase of the received signal into the opposite direction.

BRIEF DESCRIPTION OF THE INVENTION

An object of the invention is to provide an improved solution for baseband frequency error correction in a receiver.

According to an aspect of the invention, there is provided a method comprising: receiving a frequency division multiple access signal comprising a plurality of data signals on a plurality of frequency bands, separating the plurality of data signals in a frequency domain, performing an equalization for a data sequence comprised in a separated data signal, performing a frequency offset error estimation for the separated data signal, thereby obtaining estimated frequency offset correction factors, and correcting the estimated frequency offset error from the equalized data sequence in a time domain by weighting samples of the equalized data sequence with the estimated frequency offset correction factors.

According to another aspect of the invention, there is provided an apparatus comprising an interface configured to receive a frequency division multiple access signal comprising a plurality of data signals on a plurality of frequency bands. The apparatus further comprises a processing unit configured to separate the plurality of data signals in a frequency domain, to perform an equalization for a data sequence comprised in a separated data signal, to performing a frequency offset error estimation for the separated signal, thereby obtaining estimated frequency offset correction factors, and to correct the estimated frequency offset error from the equalized data sequence in a time domain by weighting samples of the equalized data sequence with the estimated frequency offset correction factors.

According to another aspect of the invention, there is provided an apparatus, comprising: means for receiving a frequency division multiple access signal comprising a plurality of data signals on a plurality of frequency bands, means for separating the plurality of data signals in a frequency domain, means for performing an equalization for a data sequence comprised in a separated data signal, means for performing a frequency offset error estimation for the separated signal, thereby obtaining estimated frequency offset correction factors, and means for correcting the estimated frequency offset error from the equalized data sequence in a time domain by weighting samples of the equalized data sequence with the estimated frequency offset correction factors.

According to another aspect of the invention, there is provided a computer program product encoding a computer program of instructions for executing a computer process for frequency error correction. The process comprises receiving a frequency division multiple access signal comprising a plurality of data signals on a plurality of frequency bands, separating the plurality of data signals in a frequency domain, performing an equalization for a data sequence comprised in a separated data signal, performing a frequency offset error estimation for the separated signal, thereby obtaining estimated frequency offset correction factors, and correcting the estimated frequency offset error from the equalized data sequence in a time domain by weighting samples of the equalized data sequence with the estimated frequency offset correction factors.

According to another aspect of the invention, there is provided a computer program distribution medium readable by a computer and encoding a computer program of instructions for executing a computer process for frequency error correction. The process comprises receiving a frequency division multiple access signal comprising a plurality of data signals on a plurality of frequency bands, separating the plurality of data signals in a frequency domain, performing an equalization for a data sequence comprised in a separated data signal, performing a frequency offset error estimation for the separated signal, thereby obtaining estimated frequency offset correction factors, and correcting the estimated frequency offset error from the equalized data sequence in a time domain by weighting samples of the equalized data sequence with the estimated frequency offset correction factors.

LIST OF DRAWINGS

In the following, the invention will be described in greater detail with reference to the embodiments and the accompanying drawings, in which.

DESCRIPTION OF EMBODIMENTS

Figure 1:
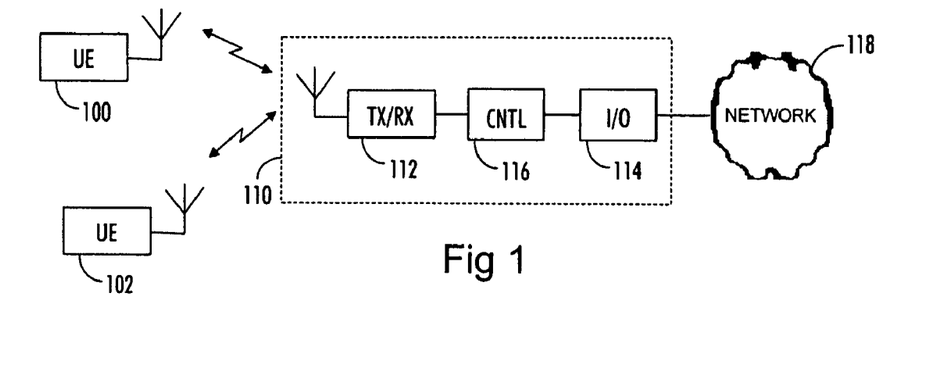
FIG. 1 illustrates a block diagram of a telecommunication system in which embodiments of the invention may be implemented.

With reference to FIG. 1, examine an example of a receiver 110 and a mobile telecommunication system, in which embodiments of the invention can be applied. The receiver 110 may be a radio receiver, such as a base station of the mobile telecommunication system, but embodiments of the invention may also be applied to other receivers. The mobile telecommunication system may be a long-term evolution of a UMTS (Universal Mobile Telecommunication System) standardized by the $3^{rd}$ Generation Partnership Project. The mobile telecommunication system may utilize orthogonal frequency division multiple access (OFDMA) for downlink communications and single-carrier frequency division multiple access (SC-FDMA) for uplink communications.

Accordingly, the base station 110 is configured to support the communication schemes listed above, but the base station 110 may be configured to support also other communication schemes. The base station 110 comprises a first communication interface 112 to provide an air interface connection to one or several mobile subscriber units 100, 102. The first communication interface 112 may comprise a plurality of antennas to enable diversity reception of radio signals. The first communication interface 112 may perform analog operations necessary for transmitting and receiving radio signals. Such operations may comprise analog filtering, amplification, up-/downconversions, and A/D (analog-to-digital) or D/A (digital-to-analog) conversion.

The base station 110 may further comprise a second communication interface 114 to provide a wired connection to the network 118 of the mobile telecommunication system. The network 118 of the mobile telecommunication system may provide connections to other networks, such as the Internet and Public Switched Telephone Network (PSTN), and/or other mobile telecommunication systems.

The base station 110 further comprises a processing unit 116 to control functions of the base station 110. The processing unit 116 handles establishment, operation and termination of radio connections with the mobile subscriber units 100, 102 the base station 110 is serving. The processing unit 116 may also perform signal processing of received radio signals. The processing unit 116 may be implemented by a digital signal processor with suitable software embedded in a computer readable medium, or by separate logic circuits, for example with ASIC (Application Specific Integrated Circuit).

Figure 2:
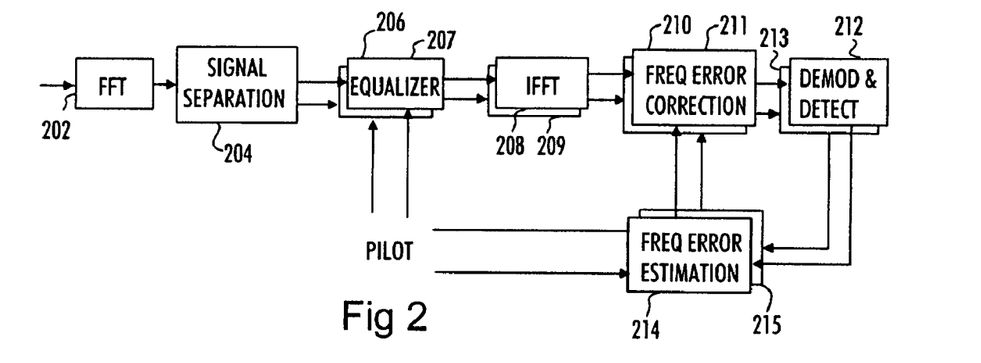
FIG. 2 illustrates a functional block diagram of a receiver according to an embodiment of the invention.

Let us now focus on an embodiment of the invention described below with reference to FIG. 2. FIG. 2 illustrates a block diagram of baseband operations carried out in the base station 110 according to an embodiment of the invention. A radio signal received by the base station is an SC-FDMA signal comprising signals transmitted from a plurality of mobile terminals 100, 102. Accordingly, each mobile terminal is assigned a frequency band for transmission of a single-carrier signal. Multiple frequency bands may be allocated to a given mobile terminal to provide the mobile terminal with higher data rates, in which case the mobile terminal transmits multiple single-carrier signals.

Since the received radio signal comprises multiple signals transmitted from different sources and through different radio environments, the base station 110 may separate the signals and process them separately, although centralized multi-user reception schemes may also be applied. Since the signals are transmitted on different frequency bands according to the FDMA scheme, they are most conveniently separated in a frequency domain. For that purpose, the received radio signal is transformed into the frequency domain through a fast Fourier transform (FFT) in an FFT unit 202. Before the FFT, a pilot sequence signal and a data sequence signal may be separated from the received signal. Each mobile terminal may transmit a pilot sequence repeatedly to facilitate equalization, synchronization, and other reception operations, and a data sequence comprising payload data. The pilot sequence and the data sequence are typically transmitted in a given section of a radio frame and, thus, the receiver is able to separate them.

Instead of FFT, a discrete Fourier transform (DFT) may be calculated from the received signal. The FFT unit 202 converts time domain samples of the data sequence signal into frequency domain samples. The pilot sequence signal may also be converted into the frequency domain, if necessary.

After the conversion into the frequency domain, frequency domain samples are applied to a signal separation unit 204 which separates the signals on different frequency bands. The signal separation unit 204 selects the frequency domain samples of the data sequence signal and the pilot sequence signal for different output branches according to a frequency band used in the transmission of each received single-carrier signal. The bands of the received single-carrier signals are defined in a communication protocol and are thereby known by the signal separation unit 204 beforehand. Accordingly, the signal separation unit 204 outputs frequency domain samples of each single carrier signal into a different output for separate processing. In the example of FIG. 2, two different single-carrier signals are considered but, in practice, the number of signals depends on the number of active users, the bandwidth capacity, etc. Frequency domain samples of a first data sequence and a first pilot sequence transmitted from a first transmitter are output to a first equalizer 206, and frequency domain samples of a second data sequence and a second pilot sequence transmitted from a second transmitter are output to a second equalizer 207.

The first equalizer 206 estimates a radio channel response from the first pilot sequence, calculates equalization weights from the estimated channel response, and equalizes the first data sequence. Similarly, the second equalizer 207 estimates a radio channel response from the second pilot sequence, calculates equalization weights from the estimated channel response, and equalizes the second data sequence. The equalizers 206 and 207 may perform the channel estimation by minimizing a mean square error (MSE) from the received pilot sequence. Before the channel estimation, the power of the corresponding received pilot sequence may be normalized to one. The MSE criterion has been proven to be quite optimal solution for the channel estimation in terms of performance and complexity. The channel response may be estimated with a state-of-the-art channel estimation algorithm based on the MSE criterion. The equalization may be carried out in the frequency domain by multiplying the frequency domain samples of the corresponding data sequence with the calculated equalization weights. The equalizers 206 and 207 may be frequency-domain equalizers estimating the channel response either from a time domain or frequency domain pilot sequence and carrying out the equalization in the frequency domain by weighting the frequency domain samples of the respective data sequences with frequency domain equalization weights. The equalization weights are typically complex conjugates of frequency domain channel response estimates.

The first and the second pilot sequence are also fed to a first and a second frequency error estimation unit 214 and 215, respectively. The frequency error estimation units 214 and 215 may estimate a frequency error from the received pilot sequence according to a state-of-the-art frequency error estimation algorithm. Alternatively, the frequency error estimation units 214 and 215 may estimate the frequency error blindly, i.e. from the data sequence. The frequency error estimation units 214 and 215 may output frequency error estimates or frequency error correction factors to respective frequency error correction units 210 and 211.

The first and the second equalized data sequence are transformed back to the time domain in inverse FFT (IFFT) units 208 and 209, respectively. Then, the frequency error correction units 210 and 211 may correct the frequency errors from the first and the second equalized data sequence, respectively, in the time domain. The frequency error correction may be carried out by weighting samples of the received data sequence with the frequency error correction factors (phase rotation values) received from the frequency error estimation unit 214 or 215, thereby negating the phase rotation in the data sequence caused by the frequency error to. The weighting may be a multiplication operation in which each sample of the data sequence is multiplied by a phase rotation value to compensate for the frequency error appearing in the radio channel. In case the frequency error correction units 210 and 211 receive the frequency error estimates from the frequency error estimation units 214 and 215, the frequency error correction units 210 and 211 may calculate the frequency error correction factors from the received frequency error estimates by calculating complex conjugates of the received frequency error estimates.

Frequency-error-corrected data sequences are then fed to respective demodulation and detection units 212 and 213, each of which demodulates the received data sequence and makes symbol decisions. The symbol decisions may be output to a symbol demapper, decoder, or another unit processing the detected symbols, but the symbol decisions may also be applied to the frequency error estimation unit to enable performing the frequency error correction in a decision-directed mode. In the decision-directed mode, previous symbol decisions are used when calculating current frequency error correction factors. With the assumption that the previously made symbol decisions are correct, the decision-directed mode improves the accuracy of the frequency error correction procedure.

Let us now describe the equalization and frequency error correction procedure in more detail. Let us first assume that a received pilot sequence is represented in a vector form according to the following linear model:

$$y = Hx + w, \quad (1)$$

where H represents a radio channel convolution matrix, x denotes a transmitted data sequence in a vector form, and w denotes a noise vector. The channel convolution matrix may have the following structure:

$$H = \begin{bmatrix} h(1) & 0 & \cdots & h(3) & h(2) \\ h(2) & h(1) & \cdots & \vdots & h(3) \\ \vdots & h(2) & \ddots & 0 & \vdots \\ 0 & \vdots & \ddots & h(1) & 0 \\ 0 & 0 & \cdots & h(2) & h(1) \end{bmatrix}, \quad (2)$$

where elements h(1), h(2), etc. represent channel coefficients together forming a channel impulse response. The circular nature of the channel matrix H is evident from equation (2). Accordingly, the first channel coefficient h(1) remains on the diagonal of the channel matrix H, and the other coefficients are located below h(1), e.g. h(2) is below each h(1), h(3) below each h(2), etc. If a channel coefficient leaks out of the dimensions of the channel matrix with respect to adjacent columns, it is placed on the top row of the next column, as is obvious from equation (2). The elements h(1), h(2), h(3), etc. may be estimated with a channel estimation algorithm based on minimizing the MSE criterion (MMSE criterion) from the received pilot sequence. The pilot sequence may be a sequence which is inherently cyclic or, if not, it may be modified into a cyclic sequence. In case a cyclic prefix is used in the transmission of the pilot sequence, the pilot sequence is inherently cyclic. A non-cyclic sequence may be modified into a cyclic sequence with an overlap-and-add, overlap-and-save, or overlap-and-cut procedure, for example. A simple method for making a non-cyclic sequence into a cyclic one is to add a number of zeros to the end of the sequence and then sum the sequence with itself by adding a number of first samples of the non-cyclic sequence, which number is equal to the number of zeros added to the end of the sequence, to the end of the sequence. The cyclic pilot sequence x may have the following structure:

$$x = [x(1) x(2) \ldots x(N) x(1) x(2)]^T, \quad (3)$$

A point of the pilot sequence being cyclic is that the channel convolution matrix H becomes in that case a circulant matrix. Before exploiting the circulant nature of the channel convolution matrix H, let us modify equation (1) by assuming that the radio channel introduced additionally a frequency error component into the transmitted signal. Accordingly, the received data sequence is represented according to the following linear model:

$$y = HDx + w, \quad (4)$$

where matrix D is a frequency error matrix. The frequency error matrix D is a diagonal matrix having the following structure:

$$D = \begin{bmatrix} e^{j2\pi\varphi_1} & 0 & 0 & 0 \\ 0 & e^{j2\pi\varphi_1} & 0 & 0 \\ 0 & 0 & \ddots & 0 \\ 0 & 0 & 0 & e^{j2\pi\varphi_N} \end{bmatrix}, \quad (5)$$

where $\varphi_1$ to $\varphi_N$ represent phase rotation values introduced into the transmitted sequence by the frequency error. Since, the channel convolution matrix H is a circulant matrix, it may be decomposed with an eigenvalue decomposition, and equation (4) may be rewritten into the following form:

$$y = F^H \Lambda_h F Dx + w, \quad (6)$$

where H as a superscript denotes a Hermite transform, i.e. a complex conjugate transpose operation, F denotes a Fourier matrix, and $\Lambda_h$ is a diagonal matrix comprising eigenvalues of the channel convolution matrix H on its diagonal. When the received sequence y is transformed into the frequency domain with a Fourier transform by multiplying equation (6) by a Fourier matrix F, the following representation is obtained:

$$Fy = \Lambda_h F Dx + Fw. \quad (7)$$

As can be seen, $F^H$ is reduced from equation (6), because $FF^H$ reduces to an identity matrix. For equation (7), elements of the eigenvalue matrix $\Lambda_h$ may be calculated with the channel estimation algorithm based on the MMSE criterion.

A generic MMSE solution used for solving a transmitted data sequence x is well known in the art. The generic MMSE solution may be represented as $$\hat{x} = C_x A^H (AC_x A^H + C_w)^{-1} y, \quad (8)$$

where $\hat{x}$ is assumed to be zero mean. $C_x$ is the covariance matrix of a parameter being estimated, $C_w$ is the noise covariance matrix, A is an observation matrix and y is the vector of received samples.

In an embodiment of the invention, the observation matrix is found from equation (7) as $A = \Lambda_h FD$. We assume the noise to be white and, thus, the noise covariance matrix may be represented as $C_w = I\sigma^2$, where I represents an identity matrix and $\sigma^2$ denotes a variance of a white Gaussian noise term. In the present MMSE solution, $C_x$ is assumed to be a diagonal matrix with the parameter variance on the diagonal. In this case, the symbols of the transmitted data sequence are assumed to be uncorrelated and, with the assumption that the power of the received is normalized to one, $C_x$ reduces to an identity matrix. Otherwise, $C_x = pI$, where p is the power of the transmitted signal. In the following, the power normalization is assumed.

The received sample vector is in the present MMSE solution of the frequency domain received sample vector Fy. As a result, the minimum MSE solution that may be used for equalizing and frequency-error-correcting the received data sequence y according to an embodiment of the invention may be represented as:

$$\hat{x} = D^H F^H (I\sigma^2 + \Lambda_h^H \Lambda_h)^{-1} \Lambda_h^H Fy. \quad (9)$$

When considering equation (9) with respect to FIG. 2, the Fourier transform of the received data sequence vector y, i.e. Fy on the right-hand side of equation (8), is the data sequence received by the equalizer 206 or 207. The equalizer 206 or 207 calculates the equalization coefficients from the received pilot sequence according to the MMSE criterion and multiplies the frequency domain samples of the received data sequence with the equalization coefficients $(I\sigma^2 + \Lambda_h^H \Lambda_h)^{-1} \Lambda_h^H$. Then, the equalized data sequence is transformed back into the time domain by multiplying the equalized data sequence by the complex conjugate transpose of Fourier matrix, i.e. by $F^H$. The frequency error matrix D may be estimated by the frequency error estimation unit 214, 215, and the frequency error correction unit 210, 211 may multiply the equalized time-domain data sequence with a complex conjugate transpose of the estimated frequency error matrix $D^H$. As a result, an equalized and frequency-error-corrected data sequence $\hat{x}$ is obtained.

In equation (9) and the description above, the interference is assumed to be uncorrelated white noise represented by $\sigma^2$. Alternatively, an interference component may be included in equation (9). In that case, the interference component may be estimated from the received pilot sequence, and an interference covariance matrix $\Lambda_R$ may be calculated. Accordingly, equation (9) may be modified to take into account the interference component, equation (9) then taking the following form:

$$\hat{x} = D^H F^H (\Lambda_R + \Lambda_h^H \Lambda_h)^{-1} \Lambda_h^H Fx. \quad (10)$$

An advantage of the embodiments described above is that the frequency error correction is performed after the FFT. In several prior art solutions, the time domain frequency error correction is performed before the FFT and before the equalization. In base station receivers receiving signals from different users according to the SC-FDMA scheme, the users are separated in the frequency domain through FFT. If the time domain frequency error correction is in such case performed before the equalization and the FFT, the frequency error is first estimated for a first user and corrected from a received signal comprising signals from multiple users. Then, the FFT is computed and the signal of the first user is separated and processed (equalized, demodulated, etc.). Thereafter, the frequency error is estimated for a second user and corrected from the received signal comprising the signals from the multiple users, and the signal of the second user is separated and processed. The same procedure is performed for every user. Obviously, this procedure results in a waste of computational resources, since the FFT has to be recomputed for every user separately. According to the embodiment of the invention, the FFT is calculated and the users are separated before the frequency error correction. Accordingly, only a single FFT has to be calculated for separating the users in the frequency domain. This reduces the complexity of the receiver significantly.

Figure 3A:
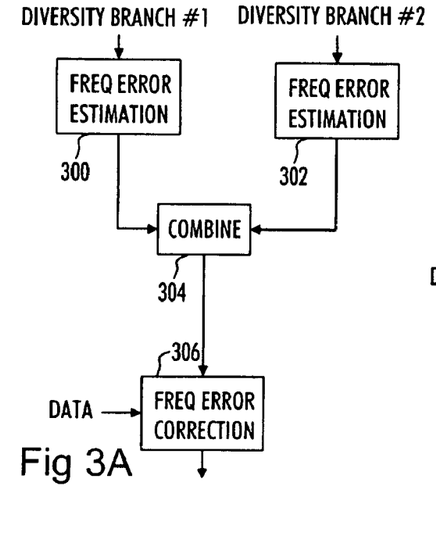
FIG. 3A illustrates frequency error correction according to an embodiment of the invention in case of diversity reception.
Figure 3B:
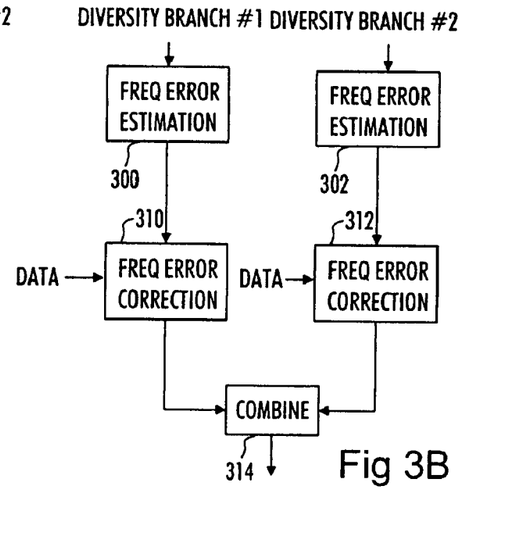
FIG. 3B illustrates frequency error correction according to another embodiment of the invention in case of diversity reception.

The receiver implementing the embodiment of the invention may utilize diversity reception when processing received radio signals. In diversity reception a signal is received through a plurality of diversity branches. The plurality of diversity branches may be arranged by utilizing a plurality of reception antennas in the reception and/or oversampling of a received signal. Correlation properties of different diversity branches may be utilized to suppress interference and improve the signal-to-noise ratio. FIGS. 3A and 3B illustrate two examples of performing the frequency error correction in the case of diversity reception.

In both examples, the frequency error estimation is carried out separately for each diversity branch. The frequency error estimation is carried out by frequency error estimation units 300 and 302 which may have the same structure and functionality as the frequency error estimation units 214 and 215 described above with reference to FIG. 2. The frequency error may be estimated from a pilot sequence received through the respective diversity branches. In the first embodiment illustrated in FIG. 3A, the frequency error estimates provided by the frequency error estimation units 300 and 302 are combined in a combiner 304 which may be an averaging unit. Accordingly, the combiner 304 may calculate an average value for the respective estimates output from the frequency error estimation units 300 and 302. Then, a frequency error correction unit 306 performs the frequency error correction for a data sequence received through the diversity branches. A plurality of data sequences received through the plurality of diversity branches may also be combined to obtain a combined data sequence to be frequency-corrected.

In the second embodiment illustrated in FIG. 3B, the frequency error estimates provided by the frequency error estimation units 300 and 302 may be output to frequency error correction units 310 and 312, respectively. Then, the frequency error correction unit 310 performs a frequency error correction for a data sequence received through the same diversity branch as a pilot sequence used by the frequency error estimation unit 300. The frequency error correction unit 310 may calculate frequency error correction factors from the frequency error estimates received from the frequency error estimation unit 300. Similarly, the frequency error correction unit 312 performs the frequency error correction for a data sequence received through the same diversity branch as a pilot sequence used by the frequency error estimation unit 302. The frequency error correction unit 312 may calculate frequency error correction factors from the frequency error estimates received from the frequency error estimation unit 302. Then, the frequency error corrected data sequences may be combined in a combiner 314. The combiner 314 may be a summation unit which sums the samples at its input ports.

Let us finally consider a process for correcting a frequency error from a received signal. The process is illustrated as a flow diagram in FIG. 4. The process may be a computer process executed in a processing unit of a receiver. The process starts in block 400.

Figure 4:
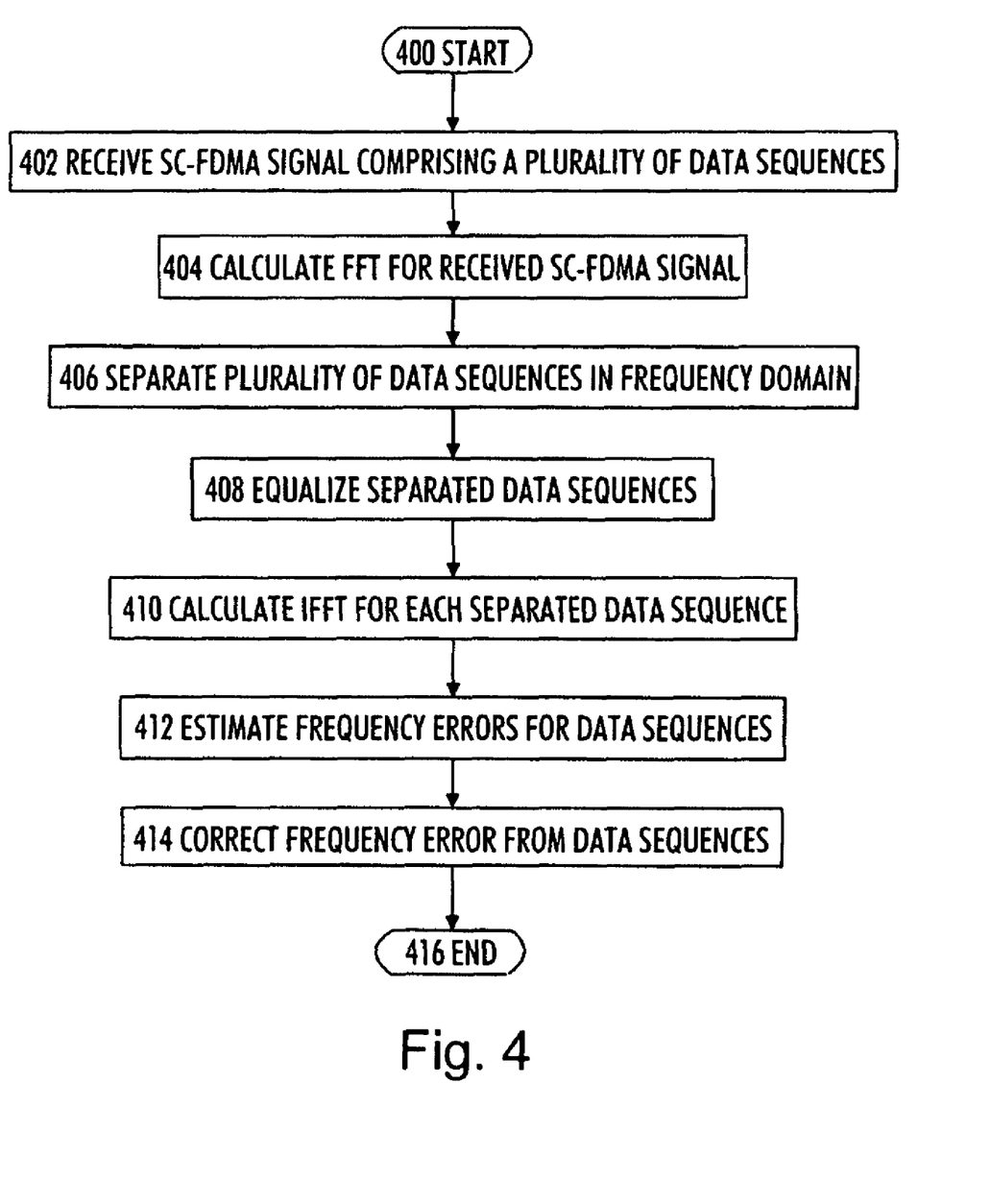
FIG. 4 is a flow diagram illustrating a process for correcting a frequency from a received signal according to an embodiment of the invention.

In block 402, an SC-FDMA signal comprising a plurality of information signals on different frequency bands is received through an interface of the processing unit. Each of the plurality of information signals may comprise a data sequence. In block 404, the received SC-FDMA signal is converted into the frequency domain by calculating an FFT, and the plurality of data sequences are separated in the frequency domain in block 406. From this point on, each of the plurality of data sequences may be processed separately.

In block 408, each of the plurality of received data sequences are equalized. Channel coefficients used in the equalization of a given data sequence may be estimated from a pilot sequence transmitted together with the data sequence. Block 408 may also include interference estimation and interference rejection. Block 408 may be a frequency domain equalization procedure performed by calculating an MMSE solution with a suitable algorithm. Block 408 may be carried out for each of the plurality of data sequences.

Then, each of the plurality of equalized data sequences is transformed back into the time domain in block 410. The inverse transform may be carried out by calculating an inverse FFT with respect to each equalized data sequence. In block 412, a frequency error estimation procedure is carried out with respect to each data sequence. As with the equalization, the frequency error may be estimated from a pilot sequence transmitted together with a given data sequence. At this stage, it should be noted that there is no need to carry out block 412 after block 410. Accordingly, the frequency error may be estimated as soon as the pilot sequence is separated from the received SC-FDMA signal and is available for frequency error estimation.

The frequency errors are corrected from the time domain equalized data sequences in block 414 by multiplying samples of the data sequences with frequency error correction factors calculated from the frequency error estimates obtained as a result of the execution of block 412. The frequency error estimation and correction executed in blocks 412 and 414, respectively, may utilize decision-directed estimation, as described above. Naturally, the process may also utilize diversity reception. The process ends in block 416.

As discussed above, the embodiments of the invention may be realized in a receiver comprising a communication interface and a processing unit. The processing unit may be configured to perform at least some of the steps described in connection with the flowchart of FIG. 4 and in connection with FIGS. 2 and 3A or 3B. The embodiments may be implemented as a computer program comprising instructions for executing a computer process for frequency error correction in a receiver.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
receiving a frequency division multiple access signal comprising a plurality of data signals on a plurality of frequency bands;
separating the plurality of data signals in a frequency domain to form separated data signals;
separately performing a frequency offset error estimation on each of a plurality of diversity branches associated with a respective separated data signal;
performing an equalization for a data sequence comprised in each of the separated data signals to form an equalized data sequence;
transforming the equalized data sequences into the time domain for the frequency error offset correction; and
correcting a frequency offset error of each of the equalized data sequences in the time domain by weighting samples of the equalized data sequences with estimated frequency offset correction factors that are derived from the frequency offset error estimations for each of the plurality of diversity branches, wherein correcting the estimated frequency offset error of each of the equalized data sequences includes performing a combining operation based on the frequency offset error estimations for each of the plurality of diversity branches.

2. The method of claim 1, further comprising:
estimating equalization parameters from a circular channel matrix formed from a cyclic pilot sequence comprised in the separated data signals.

3. The method of claim 2, further comprising:
modifying a non-cyclic pilot sequence into a cyclic form to obtain the circular channel matrix.

4. The method of claim 2, further comprising:
normalizing a power of the pilot sequence before the estimation of the equalization parameters.

5. The method according to claim 1, further comprising:
transforming the received frequency division multiple access signal into the frequency domain; and
estimating equalization parameters from a circular channel matrix formed from a cyclic pilot sequence comprised in the separated data signals by minimizing a mean square error of the circular channel matrix to obtain frequency domain equalization coefficients; and
wherein performing the equalization includes equalizing the data sequences in the frequency domain with the frequency domain equalization.

6. The method of claim 1, further comprising:
receiving the equalized data sequences through the plurality of diversity branches;
combining corresponding frequency error estimates of the plurality of diversity branches to obtain averaged frequency offset estimates; and
combining the equalized data sequences through the plurality of diversity branches; and
wherein correcting the frequency offset error includes correcting the frequency offset error through utilization of the combined equalized data sequence in the time domain by multiplying samples of the combined equalized data sequence with frequency offset correction factors calculated from the averaged frequency offset estimates.

7. The method of claim 1, further comprising:
receiving the data sequences through the plurality of diversity branches; and
wherein correcting the frequency offset error includes correcting the frequency offset error for each diversity branch separately by multiplying samples of the equalized data sequences by frequency offset correction factors calculated from the frequency offset estimates of a corresponding diversity branch and combining the frequency corrected and equalized data sequences of the diversity branches.

8. The method of claim 1, further comprising:
utilizing symbol-decision-direction in the correction of the frequency offset error from the equalized data sequences.

9. The method of claim 8, further comprising:
performing a symbol decision for a frequency error corrected symbol comprised in the equalized data sequences; and
adjusting the frequency offset correction factors for the frequency offset correction of a following symbol of the equalized data sequences.

10. The method of claim 1, further comprising:
performing the equalization according to a minimum mean square error criterion with the assumption that a noise factor corrupting the received data sequences is white noise.

11. The method any of claim 1, further comprising:
performing the equalization and the frequency error correction for each of the plurality of data sequences.

12. An apparatus comprising at least one processor and at least one memory including computer program code, the at least one memory and the computer program code configured to, with the at least one processor, direct the apparatus at least to:
receive a frequency division multiple access signal comprising a plurality of data signals on a plurality of frequency bands;
separate the plurality of data signals in a frequency domain to form separated data signals;
separately perform a frequency offset error estimation on each of a plurality of diversity branches associated with a respective separated data signal;
perform an equalization for a data sequence comprised in each of the separated data signals to form an equalized data sequence;
transform the equalized data sequences into the time domain for the frequency error offset correction; and
correct a frequency offset error of each of the equalized data sequences in the time domain by weighting samples of the equalized data sequences with estimated frequency offset correction factors that are derived from the frequency offset error estimations for each of the plurality of diversity branches, wherein the apparatus directed to correct the frequency offset error of each of the equalized data sequences includes being directed to perform a combining operation based on the frequency offset error estimations for each of the plurality of diversity branches.

13. The apparatus of claim 12, wherein the apparatus is further directed to estimate equalization parameters from a circular channel matrix formed from a cyclic pilot sequence comprised in the separated data signals.

14. The apparatus of claim 13, wherein the apparatus is further directed to modify a non-cyclic pilot sequence into a cyclic form to obtain the circular channel matrix.

15. The apparatus of claim 13, wherein the apparatus is further directed to normalize a power of the pilot sequence before the estimation of the equalization parameters.

16. The apparatus of claim 12, wherein the apparatus is further directed to:
transform the received frequency division multiple access signal into the frequency domain; and
estimate equalization parameters from a circular channel matrix formed from a cyclic pilot sequence comprised in the separated data signals by minimizing a mean square error of the circular channel matrix to obtain frequency domain equalization coefficients; and wherein the apparatus directed to perform the equalization includes being directed to equalize the data sequences in the frequency domain with the frequency domain equalization coefficients.

17. The apparatus of claim 12, wherein the apparatus is further directed to:
receive the equalized data sequences through the plurality of diversity branches;
combine corresponding frequency error estimates of the plurality of diversity branches to obtain averaged frequency offset estimates; and
combine the equalized data sequences through the plurality of diversity branches; and
wherein the apparatus directed to correct the estimated frequency offset error includes being directed to correct the frequency offset through utilization of the combined equalized data sequence in the time domain by multiplying samples of the combined equalized data sequence by frequency offset correction factors calculated from the averaged frequency offset estimates.

18. The apparatus of claim 12, wherein the apparatus is further directed to:
receive the data sequences through the plurality of diversity branches; and
wherein the apparatus directed to correct the frequency offset error includes being directed to correct the frequency offset error for each diversity branch separately by multiplying samples of the equalized data sequences by frequency offset correction factors calculated from the frequency offset estimates of the corresponding diversity branch and combining the frequency offset corrected and equalized data sequences of the diversity branches.

19. The apparatus of claim 12, wherein the apparatus is further directed to utilize symbol-decision-direction in the correction of the frequency offset error from the equalized data sequences.

20. The apparatus of claim 19, wherein the apparatus is further directed to:
perform a symbol decision for a frequency-error-corrected symbol comprised in the the equalized data sequences; and
adjust the frequency offset correction factors for the frequency offset correction of a following symbol in the equalized data sequences.

21. The apparatus of claim 12, wherein the apparatus is further directed to perform the equalization according to a minimum mean square error criterion with the assumption that a noise factor corrupting the received data sequences is white noise.

22. The apparatus of claim 12, wherein the apparatus is further directed to perform the equalization and the frequency error correction for each of the plurality of data sequences.

23. An apparatus, comprising:
means for receiving a frequency division multiple access signal comprising a plurality of data signals on a plurality of frequency bands;
means for separating the plurality of data signals in a frequency domain to form separated data signals;
means for separately performing a frequency offset error estimation on each of a plurality of diversity branches associated with a respective separated data signal;
means for performing an equalization for a data sequence comprised in each of the separated data signals to form an equalized data sequence;

means for transforming the equalized data sequences into the time domain for the frequency error offset correction; and means for correcting a frequency offset error of each of the equalized data sequences in the time domain by weighting samples of the equalized data sequences with estimated frequency offset correction factors that are derived from the frequency offset error estimations for each of the plurality of diversity branches, wherein the apparatus directed to correct the frequency offset error of each of the equalized data sequences includes being directed to perform a combining operation based on the frequency offset error estimations for each of the plurality of diversity branches.

24. A memory readable by a computer and encoded with a computer program of instructions for executing a computer process, the process comprising:

receiving a frequency division multiple access signal comprising a plurality of data signals on a plurality of frequency bands;

separating the plurality of data signals in a frequency domain to form separated data signals;

separately performing a frequency offset error estimation on each of a plurality of diversity branches associated with a respective separated data signal;

performing an equalization for a data sequence comprised in each of the separated data signals to form an equalized data sequence;

transforming the equalized data sequences into the time domain for the frequency error offset correction; and correcting a frequency offset error of each of the equalized data sequences in the time domain by weighting samples of the equalized data sequences with estimated frequency offset correction factors that are derived from the frequency offset error estimations for each of the plurality of diversity branches, wherein the apparatus directed to correct the frequency offset error of each of the equalized data sequences includes being directed to perform a combining operation based on the frequency offset error estimations for each of the plurality of diversity branches.

* * * * *

UNITED STATES PATENT AND TRADEMARK OFFICE
CERTIFICATE OF CORRECTION

PATENT NO. : 8,155,252 B2  
APPLICATION NO. : 11/806836  
DATED : April 10, 2012  
INVENTOR(S) : Piirainen et al.

Page 1 of 1

It is certified that error appears in the above-identified patent and that said Letters Patent is hereby corrected as shown below:

Column 12,
Line 43, cancel "the", first occurrence.

Signed and Sealed this
First Day of January, 2013

David J. Kappos
*Director of the United States Patent and Trademark Office*